N. G. WARTH.
PNEUMATIC TIRE.
APPLICATION FILED DEC. 10, 1919.
1,428,726.
Patented Sept. 12, 1922.
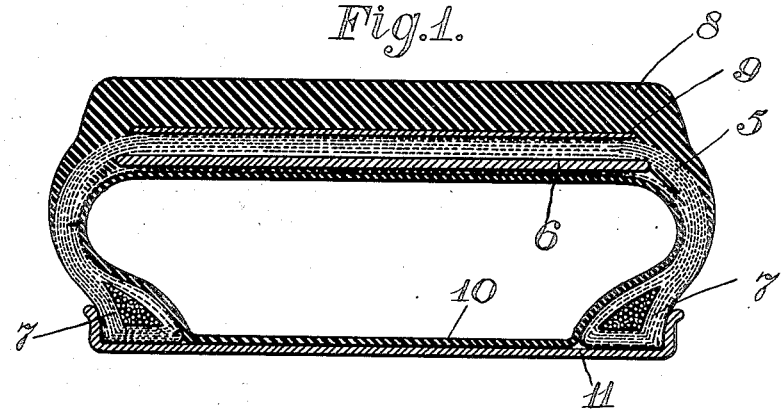
Inventor
Nathaniel G. Warth Patented Sept. 12, 1922.

1,428,726

UNITED STATES PATENT OFFICE.

NATHANIEL G. WARTH, OF GALLIPOLIS, OHIO.

PNEUMATIC TIRE.

Application filed December 10, 1919. Serial No. 343,837.

*To all whom it may concern:*

Be it known that I, NATHANIEL G. WARTH, a citizen of the United States, residing at Gallipolis, in the county of Gallia and State of Ohio, have invented a certain new and useful Improvement in Pneumatic Tires, of which the following is a specification.

This invention relates to pneumatic tires and has for its object the provision of a tire of flattened or oblate section adapted to present a broad tread to the ground as distinguished from the narrow or linear tread presented by tires whose cross section is substantially circular.

It is well known that the confined pressure of a pneumatic tire tends to cause it to assume a circular cross section hence if an oblate form is to be maintained it is necessary that means be provided for effectively resisting that tendency. It is also important that the resisting means shall not seriously interfere with the general resilience of the tire or contribute by its action in any great degree toward the destruction of the carcass and rubber envelope.

The object of the present invention is, therefore, to provide an improved construction in which the oblate form with its broad tread is effectively maintained, this being accomplished by incorporating permanently in the carcass or casing an endless inexpansible band of the proper width and strength to hold the tread in the form desired and yet permit sufficient radial and lateral flexion for all practical purposes. Further I incorporate this endless inexpansible member at a zone where in the operation of the tire it exerts the minimum of destructive action upon the incasing material. Other objects of the invention will appear from the following description.

In the accompanying drawing illustrating an embodiment of the invention,

Figure 1 is a cross section of the tire and a rim.

Fig. 2 is a cross section of a modification of the inexpansible member.

Fig. 3 is a cross section of still another modified form of inexpansible member.

Referring more particularly to Fig. 1 the character 5 designates the carcass which is built up by the ordinary process of several layers of fabric, except that superposed upon the first innermost layer or two is an endless inexpansible band 6 of metal. This band is shown in Fig. 1 as being plain and flat in cross section. It is made of substantial thickness so as not to be easily bent or indented and is of substantially the width of the tire between its beads 7. The band is primarily made as an endless belt of steel or hard impenetrable material of uniform cross section at all points and it is placed within the carcass to lie at all points thereof substantially as shown in the cross section Fig. 1. Superposed upon the carcass is the body of solid rubber 8 constituting the tread or wearing portion of the tire which portion 8 in accord with the present invention, is shown as paralleling in cross section the cross section of the band 6. In addition to the endless inexpansible band 6 I propose in some instances to introduce between the tread body 8 and the carcass a metallic band 9 which should be equal or nearly equal in width to that of the band 6 but can be of thinner metal. The purpose of this band 9 is to protect the carcass when the tread body is worn down thus permitting of one or more retreadings of the tire. This outer band 9 also cooperates with the inner one to prevent over violent or excessive action and deformation of the inner band.

The body of the casing is, of course, duly vulcanized in the usual way, the metal band or bands being treated in any suitable or well known manner to secure adhesion of the rubber thereto.

The inner tube for inflating the tire is shown at 10 and the channel or rim at 11.

The metal band can be perforated as shown in Fig. 2 to admit of more thorough incorporation of rubber therewith or the sewing of the fabric thereto. Further the band can be circumferentially corrugated as shown in the cross section Fig. 3. When so corrugated it can be formed of metal of lighter gage because of its increased resistance to local flexion.

In practice the tire thus constructed yields to a shock through a large arc rather than locally near the point where it strikes an obstruction. In other words there is little tendency to flexion of the tire at the point of contact because such flexion is resisted by the band, the latter tending to yield as a whole or in a large arc thereof carrying with it, of course, the rubber and carcass with which it is incorporated. The band by reason of its width and lateral rigidity maintains the tread in flat broad form (as viewed in cross section). Moreover because of this broad form and because the carcass and band move together under the stress of action there is little or no movement of one part relative to the other, such as is likely to work the separation of the parts and the destruction of the tire as a whole.

The forms of the parts can be changed without departing from the gist of the invention as claimed.

What I claim is:

1. A pneumatic tire comprising a casing provided with a carcass, said casing being normally of oblate form in cross section, said casing having incorporated with its carcass at the tread side a band that is inextensible and is straight and rigid in cross section and of substantially the width of the casing, said band adapted to prevent expansion of the casing from its normal oblate form upon inflation.

2. A pneumatic tire comprising a casing provided with a carcass, said casing being normally of oblate form in cross section, said casing having incorporated with its carcass at each, the inner and outer sides thereof, a band that is inextensible and is straight and rigid in cross section and of substantially the width of the casing, said bands adapted to prevent expansion of the casing from its normal oblate form upon inflation.

NATHANIEL G. WARTH.